US012390815B1

(12) United States Patent
Pine et al.

(10) Patent No.: US 12,390,815 B1
(45) Date of Patent: Aug. 19, 2025

(54) METHOD AND SYSTEM FOR CLEANING SAND

(71) Applicant: KB Foundry Services, LLC, Independence, OH (US)

(72) Inventors: Mark R. Pine, Burbank, OH (US); Zachary R. Pine, Cleveland, OH (US); Michael L. Lenahan, South Bend, IN (US)

(73) Assignee: KB Foundry Services, LLC, Independence, OH (US)

( * ) Notice: Subject to any disclaimer, the term of this patent is extended or adjusted under 35 U.S.C. 154(b) by 0 days.

(21) Appl. No.: 18/925,767

(22) Filed: Oct. 24, 2024

(51) Int. Cl.
*B03B 5/34* (2006.01)
*B08B 3/04* (2006.01)
*B22C 5/18* (2006.01)

(52) U.S. Cl.
CPC ................ *B03B 5/34* (2013.01); *B08B 3/044* (2013.01); *B22C 5/185* (2013.01)

(58) Field of Classification Search
CPC .... B03B 5/34; B03B 7/00; B03B 9/04; B08B 3/044; B22C 5/044; B22C 5/185
See application file for complete search history.

(56) References Cited

U.S. PATENT DOCUMENTS 2,480,748 A 8/1949 Luce et al.
2,783,511 A 3/1957 Will et al.
2,941,942 A 6/1960 Dahlstrom et al.
5,045,090 A 9/1991 Pohl
5,163,562 A 11/1992 Wilhelm et al.
5,289,920 A 3/1994 Godderidge et al.
(Continued)

FOREIGN PATENT DOCUMENTS

EP 08766866 A1 11/1998
EP 1387729 A2 2/2004
(Continued)

OTHER PUBLICATIONS

International Search Report and Written Opinion from corresponding International Patent Application No. PCT/US2018/019723, mailed May 7, 2019, 16 pages.
(Continued)

*Primary Examiner* — Joseph C Rodriguez
(74) *Attorney, Agent, or Firm* — Tucker Ellis LLP; Ross M. Kowalski

(57) ABSTRACT

A system for processing a sand product includes a process tank having a first compartment, a second compartment in fluid communication with the first compartment, and a third compartment that is isolated from the first compartment and the second compartment. The system also includes a first hydrocyclone configured to receive a sand mixture comprising the sand product and water from the first compartment, and separate the sand mixture into wet sand and a clay mixture. The second compartment is configured to receive the wet sand and clay mixture from the first hydrocyclone. The system also includes a second hydrocyclone configured to receive the wet sand and the clay mixture from the second compartment, and further separate the wet sand from the clay mixture to produce a clay product that can include a fully hydrated clay material. The third compartment is configured to receive the clay product from the second hydrocyclone.

20 Claims, 5 Drawing Sheets

(56) References Cited

U.S. PATENT DOCUMENTS

| | | | | |
|---|---|---|---|---|
| 5,515,907 | A * | 5/1996 | Boenisch | B22C 5/00 164/150.1 |
| 6,554,049 | B2 | 4/2003 | Steel et al. | |
| 6,691,765 | B2 * | 2/2004 | Sparks | B22C 5/18 164/412 |
| 6,715,705 | B2 | 4/2004 | Rowley, Jr. | |
| 6,834,706 | B2 | 12/2004 | Steele et al. | |
| 9,138,803 | B2 | 9/2015 | LaFay et al. | |
| 10,493,466 | B2 | 12/2019 | Pine | |
| 11,052,405 | B2 | 7/2021 | Pine | |
| 11,103,879 | B2 * | 8/2021 | Ivanoff | B03B 9/00 |
| 11,565,308 | B2 * | 1/2023 | Nieminen | B22C 5/185 |
| 2003/0029592 | A1 | 2/2003 | Steele et al. | |
| 2008/0202986 | A1 | 8/2008 | Fontaine | |
| 2012/0325113 | A1 | 12/2012 | Lafay | |
| 2015/0114259 | A1 | 4/2015 | Ogura et al. | |
| 2018/0243755 | A1 | 8/2018 | Pine | |
| 2019/0193142 | A1 | 6/2019 | Darlington, Jr. et al. | |
| 2020/0061634 | A1 | 2/2020 | Pine | |

FOREIGN PATENT DOCUMENTS

| | | | |
|---|---|---|---|
| EP | 2191909 | B1 | 6/2010 |
| GB | 2238740 | A | 6/1991 |
| WO | 2001085336 | A1 | 11/2001 |
| WO | 2011082464 | A1 | 7/2011 |

OTHER PUBLICATIONS

S. Fiore & M.C. Zanetti (2008) Industrial Treatment Processes for Recycling of Green Foundry Sands, International Journal of Cast Metals Research, 21:6, 435-438.

* cited by examiner

METHOD AND SYSTEM FOR CLEANING SAND

TECHNICAL FIELD

In general, the present invention relates to a system and method for processing foundry waste products to create a reusable clay product.

BACKGROUND OF THE INVENTION

Foundry operations utilize green sand to create molds for casting metal products. The green sand typically comprises a mixture of sand, a binder material (e.g., clay and carbon mix), and water. The molds are formed, the casting is made, and the used sand is removed from the casting. The resulting used sand can be disposed of, or portions may be re-used after being subjected to specialized treatment. Re-using sand products from a foundry can potentially save resources for a foundry. However, the effective collection and treatment of high-quality re-use sand often utilizes specialized processes and systems.

SUMMARY OF THE INVENTION

As provided herein, one or more methods and systems for cleaning a sand product from a foundry sand handling operation is provided. A sand product such as foundry sand can be collected from a variety of places in a foundry, including a mold making operation, and/or a casting removal and cleaning process. The collected sand product can be cleaned and separated into a clay material such as a material that includes a clay and carbon mixture, and a beneficial re-use sand. The clay and carbon mixture may be re-used in the foundry, and the beneficial re-use sand can be used offsite.

In accordance with an embodiment of the present invention a system for processing a sand product includes a process tank that has a first compartment, a second compartment in fluid communication with the first compartment, and a third compartment that is isolated from the first compartment and the second compartment. The system also includes a first hydrocyclone configured to receive a sand mixture comprising the sand product and water from the first compartment, and separate the sand mixture into wet sand and a clay mixture. The second compartment is configured to receive the wet sand and clay mixture from the first hydrocyclone. The system also includes a second hydrocyclone configured to receive the wet sand and the clay mixture from the second compartment, and further separate the wet sand from the clay mixture to produce a clay product that can contain a fully hydrated clay material. The third compartment is configured to receive the clay product from the second hydrocyclone.

In one aspect, the process tank further includes a first wall separating the first compartment from the second compartment. The first wall extends partially towards a bottom of the process tank, defining a gap that provides the fluid communication between the first compartment and the second compartment. The process tank also includes a second wall separating and providing isolation between the second compartment and the third compartment.

In one aspect, the process tank further includes a first mixer configured to mix the sand mixture within the first compartment, a second mixer configured to mix the wet sand and the clay mixture in the second compartment, and a third mixer configured to mix the clay product in the third compartment.

In one aspect, the system includes a first pump configured to pump the sand mixture from the first compartment to the first hydrocyclone, and a second pump configured to pump the wet sand and the clay mixture from the second compartment to the second hydrocyclone.

In one aspect, the system further includes a holding tank configured to receive the clay product from the third compartment.

In one aspect, the system further includes a third pump configured to pump the clay product from the third compartment to the holding tank.

In one aspect, the first hydrocyclone is larger than the second hydrocyclone.

In one aspect, the system further includes a conveyor configured to transport the sand product from a hopper into the first compartment.

In another embodiment, a method of processing a sand product includes adding water and the sand product to a first compartment of a process tank, mixing the water and the sand product in the first compartment to create a sand mixture, pumping the sand mixture from the first compartment to a first hydrocyclone, separating, in the first hydrocyclone, the sand mixture into wet sand and a clay mixture, receiving, from the first hydrocyclone, the wet sand and the clay mixture in a second compartment of the process tank, pumping the wet sand and the clay mixture from the second compartment to a second hydrocyclone, further separating, in the second hydrocyclone, the wet sand from the clay mixture to produce a clay product; and receiving, from the second hydrocyclone, the clay product in a third compartment of the process tank that is isolated from the first compartment and the second compartment.

In one aspect, the first compartment is in fluid communication with the second compartment.

In one aspect, adding the water and the sand product to the first compartment includes continuously adding the water at a fixed water rate and the sand product at a fixed sand product rate such that a constant level is maintained in the first compartment while pumping the sand mixture from the first compartment to the first hydrocyclone.

In one aspect, the method further includes pumping the clay product from the third compartment to a holding tank when a threshold level is reached within the third compartment.

In another embodiment, a system for processing a sand product includes a process tank including a first compartment, a second compartment in fluid communication with the first compartment, and a third compartment that is isolated from the first compartment and the second compartment. The system further includes a first hydrocyclone, a second hydrocyclone, a first pump, a second pump, and a controller configured to: operate the first pump to pump a sand mixture comprising the sand product and water from the first compartment to the first hydrocyclone such that a wet sand and a clay mixture flow from the first hydrocyclone into the second compartment, and operate the second pump to pump the wet sand and the clay mixture from the second compartment to the second hydrocyclone such that a clay product flows from the second hydrocyclone to the third compartment.

In one aspect, the system further includes a third pump and a holding tank, wherein the controller is further configured to receive a level of the clay product in the third compartment, and in response to the level reaching a threshold level, operating the third pump to pump the clay product to the holding tank.

In one aspect, the process tank further includes a first wall separating the first compartment from the second compartment. The first wall extends partially towards a bottom of the process tank, defining a gap that provides the fluid communication between the first compartment and the second compartment. The process tank further includes a second wall separating and providing isolation between the second compartment and the third compartment.

In one aspect, the process tank further includes a first mixer configured to mix the sand mixture within the first compartment, a second mixer configured to mix the wet sand and the clay mixture in the second compartment, and a third mixer configured to mix the clay product in the third compartment.

In one aspect, the first hydrocyclone is larger than the second hydrocyclone.

In one aspect, the system further includes a conveyor configured to transport the sand product from a hopper into the first compartment.

In one aspect, the controller is further configured to operate the conveyor to continuously add the sand product to the first compartment at a fixed sand product rate, and to continuously add water at a fixed water rate.

In one aspect, the fixed sand product rate and the fixed water rate are selected such that a constant level is maintained in the first compartment while the controller operates the first pump to pump the sand mixture to the first hydrocyclone.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to a system for processing a sand product. An embodiment of the system includes a process tank that has a first compartment, a second compartment in fluid communication with the first compartment, and a third compartment that is isolated from the first compartment and the second compartment. The system also includes a first hydrocyclone configured to receive a sand mixture comprising the sand product and water from the first compartment, and separate the sand mixture into wet sand and a clay mixture. The second compartment is configured to receive the wet sand and clay mixture from the first hydrocyclone. The system also includes a second hydrocyclone configured to receive the wet sand and the clay mixture from the second compartment, and further separate the wet sand from the clay mixture to produce a clay product that contains a fully hydrated clay material. The third compartment is configured to receive the clay product from the second hydrocyclone. The system takes a sand product that is a result of foundry operations and ultimately processes it into a clay product that can be reused in a foundry's operations.

Beneficial re-use foundry sand has found use in a variety of applications and industries. Further, beneficial re-use foundry sand can be a commodity instead of a waste product, potentially saving resources for a foundry. Beneficial re-use foundry sand comprises sand that has been used by the foundry and typically may not be appropriate for re-use by the foundry. Effective collection of high-quality re-use sand may utilize specialized processes and systems.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

Figure 1:
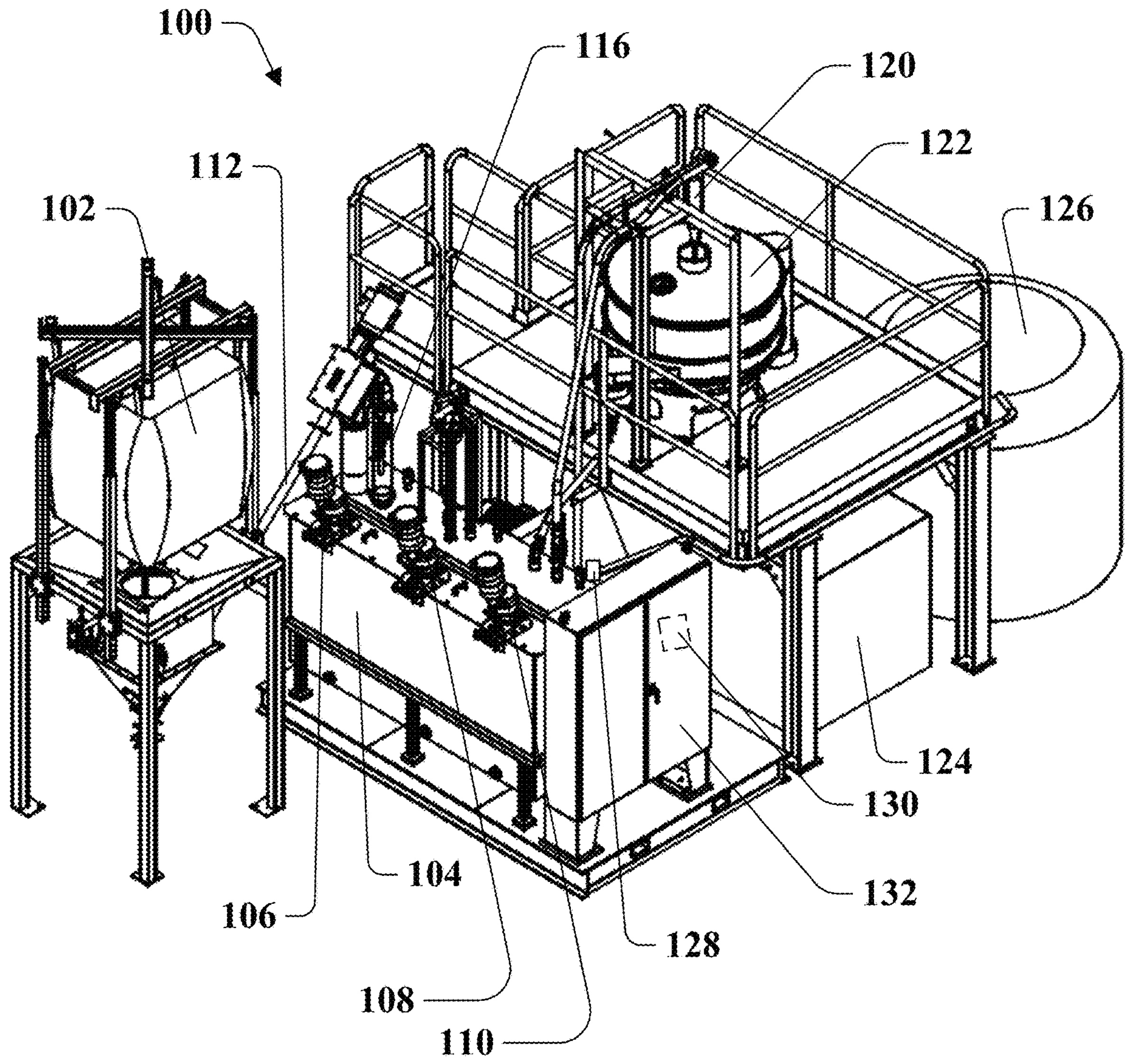
FIG. 1 is a perspective view of an exemplary system for processing a sand product.
Figure 2:
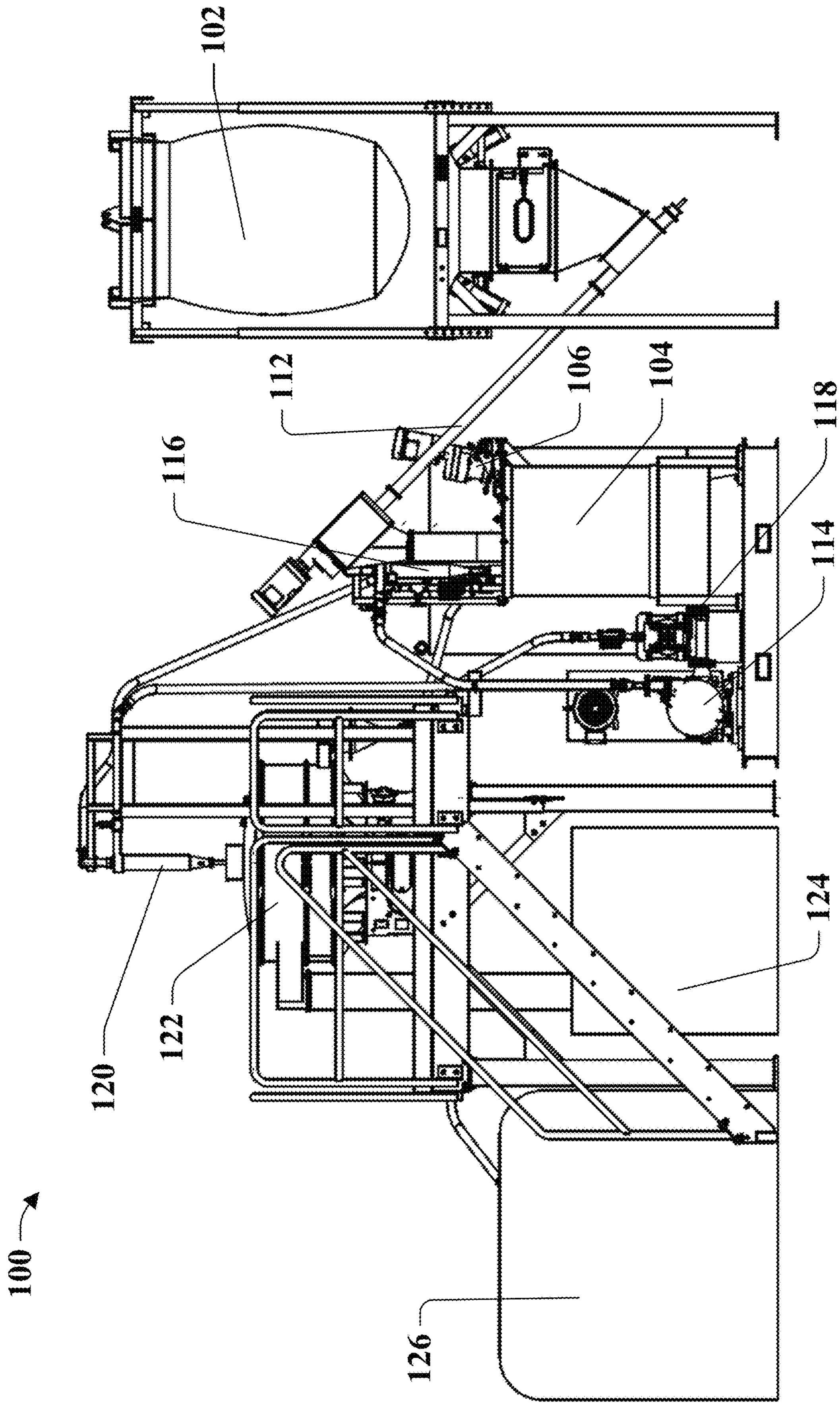
FIG. 2 is an elevation view of the exemplary system for processing a sand product.
Figure 3:
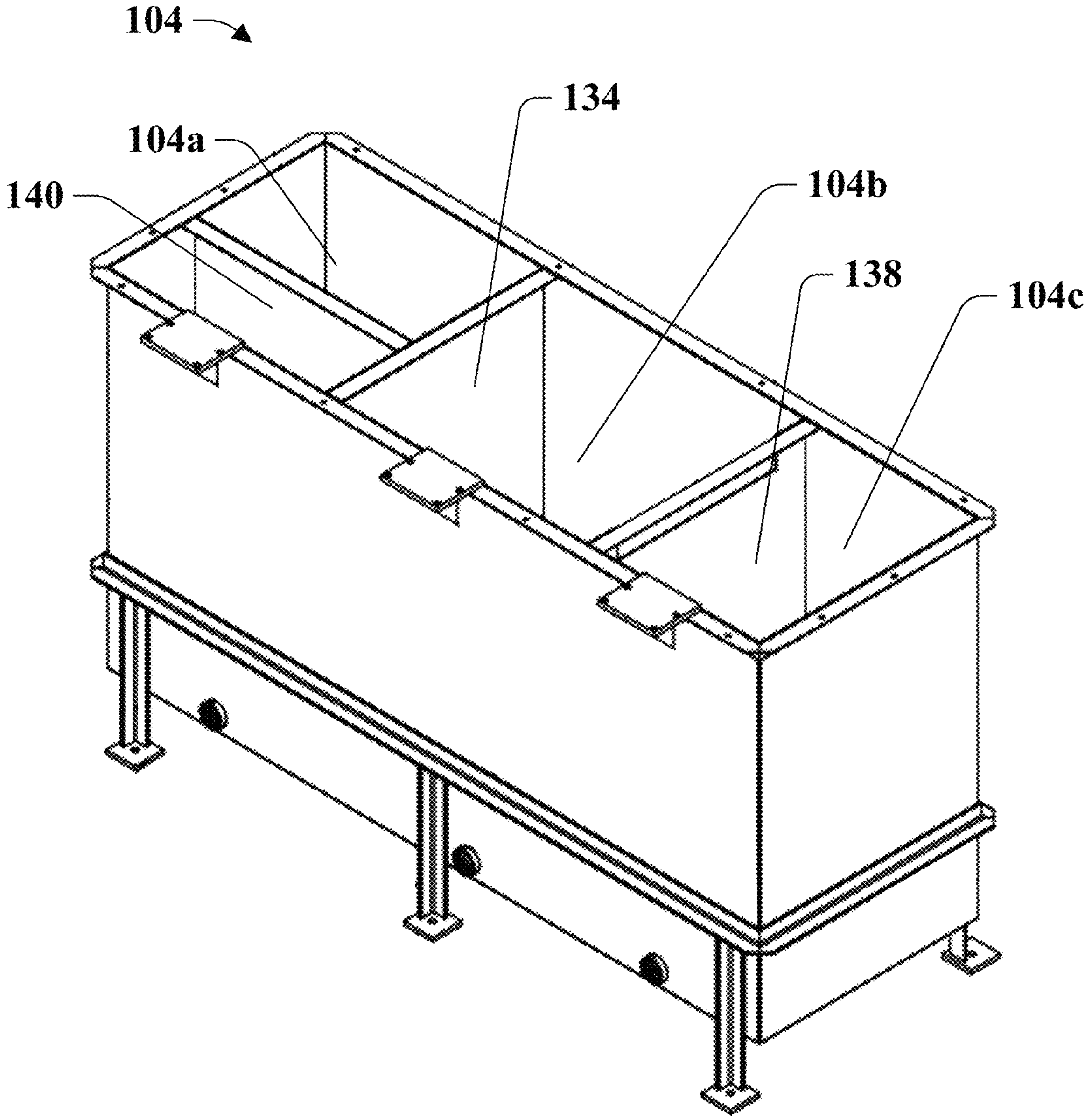
FIG. 3 is a perspective view of an exemplary process tank.

A system can be devised that can produce a high-quality clay material from a sand product from a foundry. Referring now to the drawings, wherein the drawings are for the purpose of illustrating an exemplary embodiment of the invention only and not for the purpose of limiting same, FIG. 1 and FIG. 2 illustrate an exemplary system 100 for processing a sand product. The system 100 can include a sand hopper 102 that can be supported by or coupled to a support structure. The sand hopper 102 can be a fixed unit, or it can be a collection bag or baghouse transported from a foundry. The system 100 further includes a process tank 104. The process tank 104 can include a first compartment 104*a*, a second compartment 104*b*, and a third compartment 104*c* (as shown in FIG. 3 and described in greater detail below). The process tank 104 can further include a first mixer 106 that extends into the first compartment 104*a*, a second mixer 108 that extends into the second compartment 104*b*, and a third mixer 110 that extends into the third compartment 104*c*. The first mixer 106, second mixer 108, and the third mixer 110 can include rotating blades designed to push solids down and then up the sides of the respective compartment to keep the solids in suspension. In certain embodiments, the first mixer 106, second mixer 108, and the third mixer 110 can be made of a metal or an alloy, such as bronze, or any other metal/alloy chosen using sound engineering judgment.

A conveyor 112 can extend from the hopper 102 to an entrance to the first compartment 104*a*. By way of example and not limitation, the conveyor 112 can be a screw conveyor, a belt conveyor, or a bucket elevator, among others. The conveyor 112 is configured to transport the contents of the hopper 102, such as a sand product, into the first compartment 104*a*. The system 100 further includes a first pump 114 and a first hydrocyclone 116. The first pump 114 can be configured to pump the contents of the first compartment 104*a*, such as a sand mixture of the sand product and water, to the first hydrocyclone 116 via one or more pipes, tubes, or hoses. In one embodiment, the first hydrocyclone 116 is mounted at a position above the process tank 104, specifically above the first compartment 104*a* and/or the second compartment 104*b*. The system 100 further includes a second pump 118 and a second hydrocyclone 120. The second pump 118 can be configured to pump the contents of the second compartment 104*b*, such as wet sand and a clay mixture, to the second hydrocyclone 120 via one or more pipes, tubes, or hoses. In one embodiment, the second hydrocyclone 120 can be mounted on a platform or scaffolding, at a position higher than the process tank 104. In certain embodiments, the first hydrocyclone 116 is larger than the second hydrocyclone 120. For example, the first hydrocyclone 116 can be a three-inch hydrocyclone and the second hydrocyclone 120 can be a two-inch hydrocyclone. The three-inch hydrocyclone has a three-inch diameter inlet and the two-inch hydrocyclone has a two-inch diameter inlet.

In certain embodiments, the first pump 114 and/or the second pump 118 is a slurry pump. The first pump 114 and/or the second pump 118 can be constructed from any material chosen using sound engineering judgment. In one example, the first pump 114 and/or the second pump 118 is made at least partially of chrome to withstand the silica sand that is abrasive. In one embodiment, the first pump 114 and/or the second pump 118 is constructed of 27% chrome.

A separator 122 can be positioned beneath the second hydrocyclone 120 to collect wet sand and further separate remnant water from the wet sand. A sand bin 124 can be coupled to the separator 122 such that sand separated out in the separator 122 can fall into the sand bin 124 for containment and storage. The system 100 can also include a holding tank 126. The holding tank 126 can be configured to store the clay product resulting from the second hydrocyclone 120. A third pump 128 can be configured to pump the clay product from the third compartment 104*c* to the holding tank 126 via one or more pipes, tubes, or hoses. In one embodiment, the third pump 128 is a diaphragm pump.

The system 100 and its components (e.g. the conveyor 112, the first pump 114, and the second pump 118) can be controlled by a controller 130 located within a control cabinet 132. The controller 130 can be, for example, a programmable logic controller (PLC). In other embodiments, the controller 130 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The controller 130 may be a microprocessor, but in the alternative, the controller 130 may be any processor, controller, microcontroller, or state machine. The controller 130 may also be implemented as a combination of computing devices, for example a combination of a DSP and a microprocessor, a plurality of microprocessors, multi-core processors, one or more microprocessors in conjunction with a DSP core, or any other such configuration. The controller 130 can be configured by way of software code such as ladder logic, among others, to perform the methods disclosed herein.

Figure 4:
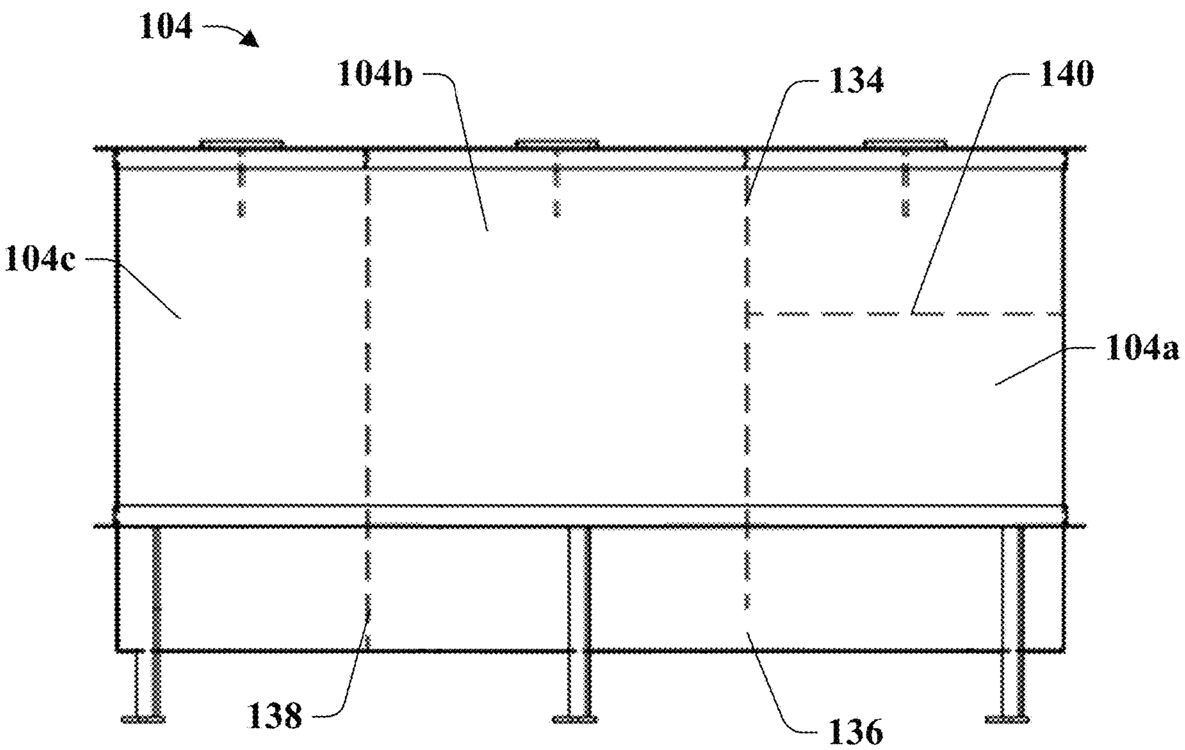
FIG. 4 is a rear cross-sectional view of the exemplary process tank.
Figure 5:
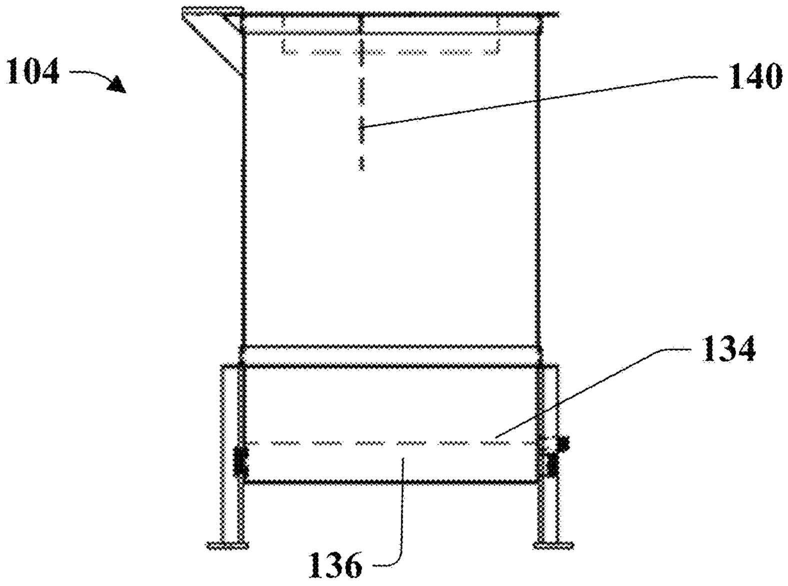
FIG. 5 is a side cross-sectional view of the exemplary process tank.

Turning now to FIGS. 3-5, a process tank 104 is shown. The process tank 104 can include a first compartment 104*a*, a second compartment 104*b*, and a third compartment 104*c*. The first compartment 104*a* is separated from the second compartment 104*b* by a first wall 134. The first wall 134 extends partially towards the bottom of the process tank 104 and defines a gap 136 below a bottom of the first wall 134 that provides fluid communication between the first compartment 104*a* and the second compartment 104*b*. In other words, the first compartment 104*a* and the second compartment 104*b* are not isolated from one another, and a portion of the contents of the first compartment 104*a* may flow into the second compartment 104*b* through the gap 136 and a portion of the contents of the second compartment 104*b* may flow into the first compartment 104*a* through the gap 136.

The second compartment 104*b* and the third compartment 104*c* are separated by a second wall 138. The second wall 138 can extend the entire depth of the process tank 104 and provides fluid isolation of the third compartment 104*c* from the second compartment 104*b*. In this manner, the third compartment 104*c* is isolated from both the first compartment 104*a* and the second compartment 104*b* such that none of the contents from the first compartment 104*a* or second compartment 104*b* can flow into the third compartment 104*c* and none of the contents from the third compartment 104*c* can flow into the first compartment 104*a* or the second compartment 104*b*. In certain embodiments, there may be a third wall 140 arranged within the first compartment 104*a* and perpendicular to the first wall 134. The third wall 140 extends only a portion of the depth of the first compartment 104*a* and acts as a self levelling system.

Figure 6:
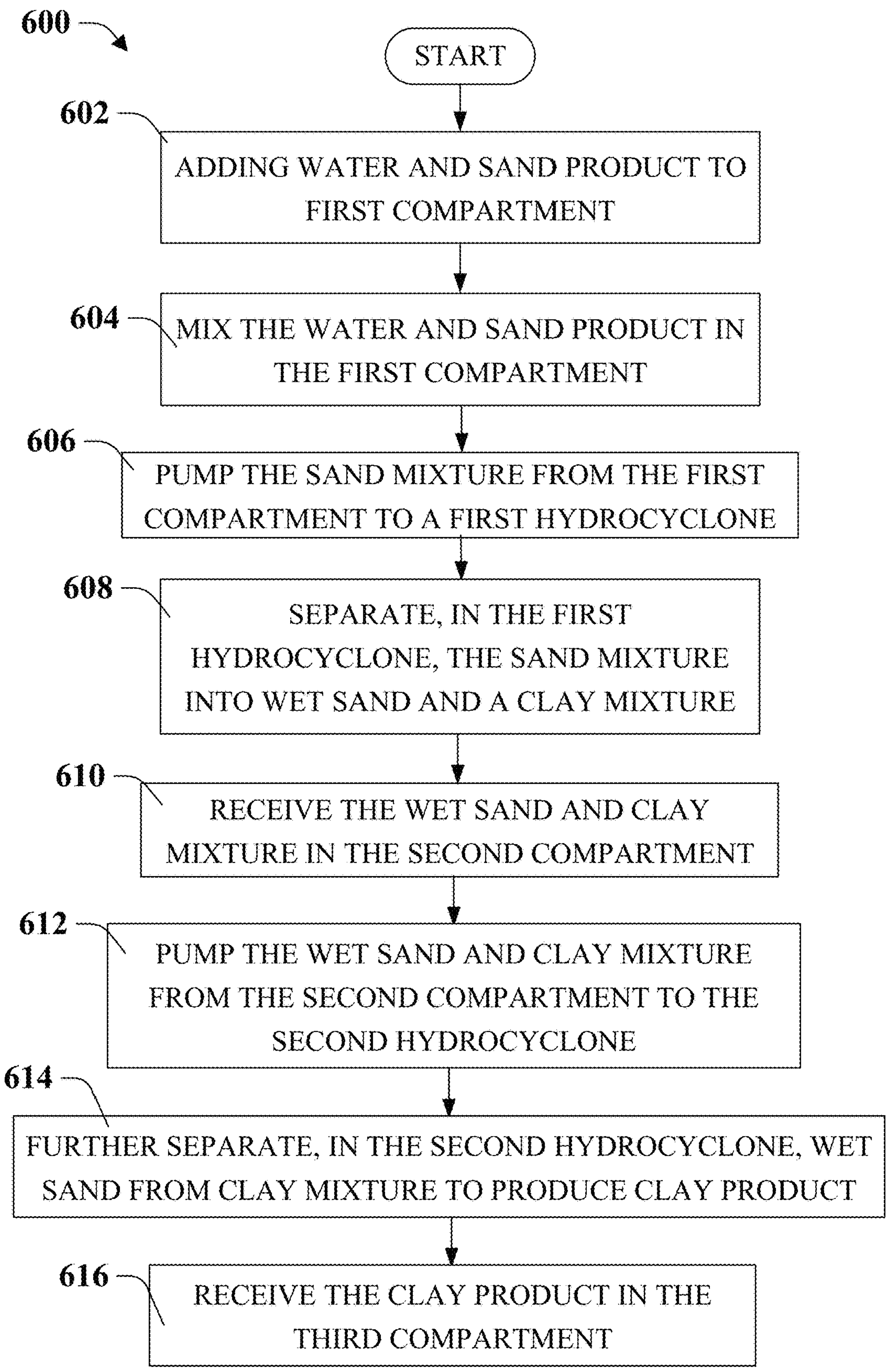
FIG. 6 is a flow diagram depicting an exemplary method for processing a sand product.

Turning now to FIG. 6, a flow chart of a method for processing a sand product 600 is depicted. At reference numeral 602, water and a sand product are added to the first compartment 104*a* of the process tank 104. In one implementation, the sand product may comprise a material that is collected from a foundry bag-house collection system. That is, for example, during foundry sand handling procedures, such as separation of the castings from the molds, handling and reconditioning of the used sand during shake-out or knock-out, mechanical and pneumatic conveying, bucket elevators, mixers and sand coolers, as well as cast cleaning, foundries often employ dust collection equipment to collect the airborne particulate released during these procedures. In this implementation, the collected sand product, which may comprise dust and other collected material, can be used as the sand product in the example methods and systems described herein. As one example, the sand product collected from the dust collection systems may comprise approximately fifty percent (50%) sand and approximately fifty percent (50%) clay and carbon mixture. In one non-limiting example, the clay may be a bentonite clay.

In another implementation, the sand product may comprise used sand that is collected from spent foundry sand. As an example, green sand is used to create the molds for cast products, and after the casting is created, the mold sand can be collected as used or spent foundry sand. Further, during the mold creation process, excess sand may be generated during the mold creation process, which can also be collected. In this example, these types of used foundry sand can comprise the sand product in the example methods and systems described herein. As one example, the sand product collected from the used or spent foundry sand may comprise approximately the same constituent make-up as green sand used to make the molds.

The sand product can be provided in the hopper 102, which can be taken directly from a foundry baghouse system. The sand product can be transported from the hopper 102 to the first compartment 104*a* by way of the conveyor 112. The water can be added from a water source (e.g. utility water hookup or on-site water storage) to the first compartment 104*a* through pipes, tubes, or hoses that are opened or closed by way of one or more valves that can be controlled by the controller 130. The controller 130 can control the amount and/or rate of addition of the sand product by, for example, controlling the speed of the conveyor 112. Similarly, the controller 130 can control the amount and/or rate of addition of the water to the first compartment 104*a* by, for example, operating a water valve.

Accordingly, the controller 130 can adjust the ratio of additions of the sand product and the water into the first compartment 104*a* and also the flow rate of each the sand product and the water into the first compartment 104*a*.

In one implementation, the water and sand product may be introduced to the first compartment 104*a* at an approximate ratio of about three-parts water to one part sand product or less. The ratio may be about two-parts water to one part sand product. As another example, the specific ratio of water to sand product may be altered to provide a desired sand product/water mix, depending on the type of sand product that is used, and the type and specifications of the first mixer 106 used, along with the specifications for the other parts of the system, including the first pump 114, the first hydrocyclone 116, the second pump 118, and the second hydrocyclone 120. In one embodiment, the controller 130 operates the water input (e.g. water valve) so that the water is added at a fixed water rate and the controller 130 operates the conveyor 112 so that the sand product is added at a fixed sand product rate, such that a constant volume level is maintained in the first compartment 104*a*.

At reference numeral 604, the first mixer 106 mixes the water and the sand product in the first compartment 104*a* to create a sand mixture. The first mixer 106 can be configured to mix water and the sand product, resulting in a sand mixture comprising the sand product and water that have been added to the first compartment 104*a*. As an example, the first compartment 104*a* may be configured to continuously receive a supply of water and a supply of sand product, and the first mixer 106 can continually mix these ingredients to produce a continual flow of the sand product/water mix. In one example, the water and sand product may be received at a top area of the first compartment 104*a*, and the sand mixture may be discharged from a bottom portion of the first compartment 104*a*.

At reference numeral 606, the sand mixture is pumped from the first compartment 104*a* to the first hydrocyclone 116, by way of the first pump 114. The first pump 114 can pump out the sand mixture from the first compartment 104*a* continuously while the water and the sand product are continuously being added to the first compartment 104*a*. In one example, the water and the sand product are added through the top of the first compartment 104*a* and the first pump 114 pumps the sand mixture out of the first compartment 104*a* from the bottom of the first compartment 104*a*. As discussed above, the controller 130 can operate the water input (e.g. water valve) so that the water is added at a fixed water rate and the controller 130 operates the conveyor 112 so that the sand product is added at a fixed sand product rate, such that a constant volume level is maintained in the first compartment 104*a*, taking into account the exiting flow rate of the sand mixture being pumped out of the first compartment 104*a* by the first pump 114. In other words, the fixed sand product rate and the fixed water rate can be selected such that the volume of the sand mixture in the first compartment 104*a* remains constant due to the volume of the water and sand product entering the first compartment 104*a* being equal to the volume of the sand mixture being pumped out of the first compartment 104*a* by the first pump 114. In this manner, the system 100 can operate in a continuous mode that does not require intervention by an operator during operation.

At reference numeral 608, the first hydrocyclone 116 separates the sand mixture into wet sand and a clay mixture. For example, the first hydrocyclone 116 can be used to separate or sort particles in a liquid based on their fluid resistance. In this example, denser or courser particles such as sand typically have a higher fluid resistance to a generated centripetal force than the less dense or finer particles such as clay and carbon, as well as water. That is, for example, the sand mixture containing the sand product and water can be pumped from the first compartment 104*a* into the first hydrocyclone 116 at a desired pressure (e.g., thirty pounds of pressure per square inch (PSI) or more) to generate a desired centripetal force inside the first hydrocyclone 116. In this example, because the sand is courser and denser than the clay and or carbon found in recovered sand product, wet sand can be separated from a clay mixture that can include one or more of clay, carbon, and water. Typically, the denser and/or courser material is retrieved from a bottom of the first hydrocyclone 116, and the lighter and/or finer material can be drawn from a top portion of the first hydrocyclone 116.

In one implementation, the clay mixture containing clay, carbon, and water that is collected from the first hydrocyclone 116 contains approximately ten to twenty-two percent (10-22%) solids, with the remaining portion comprising water. Further, in one implementation, typical makeup of the collected solids can comprise approximately seventy-five percent (75%) clay and twenty-five percent (25%) carbon; however, this makeup will be dependent upon the sand product input to the first compartment 104*a* of the example method or system, along with the setup of the first hydrocyclone 116.

The wet sand and the clay mixture from the first hydrocyclone 116 flow into the second compartment 104*b* of the process container 104. At reference numeral 610, the second compartment 104*b* receives the wet sand and clay mixture from the first hydrocyclone 116. The pressure of the sand mixture flowing into the first hydrocyclone 116, which is produced by the first pump 114, causes the outputs of the first hydrocyclone 116, namely the wet sand and the clay mixture, to flow through pipes, tubes, or hoses into the second compartment 104*b*. In certain embodiments, the second mixer 108 can further mix the wet sand and clay mixture to homogenize distribution of the contents within the second container 104*b*. It should be appreciated that due to the gap 136 and the resulting fluid communication between the first container 104*a* and the second container 104*b*, the level of the contents of the first container 104*a* and the second container 104*b* is homogeneous. The fluid level of the contents of the first container 104*a* is substantially the same as the fluid level in the second container 104*b*. A portion of the sand mixture within the first container 104*a* may flow into the second container 104*b* through the gap 136, and similarly, a portion of the wet sand and clay mixture within the second container 104*b* may flow into the first container 104*a* through the gap 136.

At reference numeral 612, the wet sand and clay mixture is pumped from the second compartment 104*b* to the second hydrocyclone 120, by way of the second pump 118. The rate at which the second pump 118 pumps the wet sand and clay mixture out of the second compartment 104*b* can be selected such that the level of contents within the second compartment 104*b* and the first compartment 104*a* remains constant, or within a level range defined by a minimum level and a maximum level, during operation as to support the continuous nature of the process.

At reference numeral 614, the second hydrocyclone 120 further separates wet sand from the clay mixture. For example, similar to operation of the first hydrocyclone 116, the second hydrocyclone 120 can be used to separate or sort particles in a liquid based on their fluid resistance. In this example, denser or courser particles such as sand typically have a higher fluid resistance to a generated centripetal force than the less dense or finer particles such as clay and carbon, as well as water. That is, for example, the wet sand and clay mixture (and any sand mixture that has made its way into the second compartment 104*b*) can be pumped from the second compartment 104*b* into the second hydrocyclone 120 at a desired pressure (e.g., thirty pounds of pressure per square inch (PSI) or more) to generate a desired centripetal force inside the second hydrocyclone 120. In this example, because the sand is courser and denser than the clay mixture, wet sand can be further separated from the clay mixture that can include one or more of clay, carbon, and water. Typically, the denser and/or courser material is retrieved from a bottom of the second hydrocyclone 120, and the lighter and/or finer material can be drawn from a top portion of the second hydrocyclone 120. The second hydrocyclone 120 is smaller than the first hydrocyclone 116. As a result, the first hydrocyclone 116 provides a course level of separation of wet sand from the clay mixture and the second hydrocyclone 120 provides a finer level of separation of wet sand from the clay mixture to result in a clay product that can include fully hydrated clay material, carbon, and/or water.

In one implementation, the clay product containing fully hydrated clay material, carbon, and water that is collected from the second hydrocyclone 120 contains approximately ten to twenty-two percent (10-22%) solids, with the remaining portion comprising water. Further, in one implementation, typical makeup of the collected solids can comprise approximately seventy-five percent (75%) clay and twenty-five percent (25%) carbon; however, this makeup will be dependent upon the sand product input to the first compartment 104*a* of the example method or system, along with the setup of the second hydrocyclone 120.

In one implementation, the wet sand drawn from the second hydrocyclone 120 may be introduced to a separator 122 that is configured to further separate remnant water from the wet sand. That is, for example, the second hydrocyclone 120 separates most of the water from the sand, as the water can be included with the clay product. As an example, the separator can comprise any system suitable for performing the function of separating water from the wet sand, such as those that are commercially available. Further, as an example, depending on an amount of moisture content desired for a resulting beneficial re-use sand, a dryer may be utilized to bring the moisture content to a desired level.

In one implementation, the water separated from the wet sand may be introduced into the first compartment 104*a* along with the sand product as part of the step described by reference numeral 602. As an example, at least a portion of the water used in the addition step of 602 and the mixing step of 604 may comprise water collected from the separator 122. Further, as an example, beneficial re-use sand can be collected from the separator 122 and stored in the sand bin 124. For example, beneficial re-use sand can find other uses that may not be related to foundry operations. In this example, the beneficial re-use sand can be collected and transported (e.g., or stored) off-site, or alternatively, disposed of by other methods.

At reference numeral 616, the third compartment 104*c* receives the clay product from the second hydrocyclone 120. The pressure of the wet sand and clay mixture flowing into the second hydrocyclone 120, which is produced by the second pump 118, causes the clay product output from the second hydrocyclone 120 to flow through pipes, tubes, or hoses into the third compartment 104*c*. The clay product within the third compartment 104*c* is isolated from the contents of the first compartment 104*a* and second compartment 104*b* to avoid mixing or contaminating the desired clay product with additional water, sand product, wet sand, clay mixture, or any combination of these process materials. It should be appreciated that the method 600 can be operated in a continuous manner until the third compartment 104*c* reaches a desired fill level or maximum level of the third compartment 104*c*. When the controller 130 detects that a level threshold is reached within the third compartment 104*c* (e.g. from a level sensor in the third compartment 104*c*), the controller 130 can cease operation of the process by, for example, stopping the first pump 114, the second pump 118, the conveyor 112, and the water input.

In certain embodiments, a third pump 128 can be configured to pump the clay product from within the third compartment 104*c*, through pipes, tubes, or hoses, into a holding tank 126. Once the clay product is pumped out of the third compartment 104*c* to free up space within the third compartment 104*c*, the process of method 600 can be started again and run continuously once more. In one embodiment, the controller is configured to receive a level of the clay product in the third compartment 104*c*, and in response to the level reaching a threshold level, operating the third pump 128 to pump the clay product to the holding tank 126.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A system for processing a sand product, comprising:
a process tank comprising:
a first compartment;
a second compartment in fluid communication with the first compartment; and
a third compartment that is isolated from the first compartment and the second compartment;
a first hydrocyclone configured to receive a sand mixture comprising the sand product and water from the first compartment, and separate the sand mixture into wet sand and a clay mixture, wherein the second compartment is configured to receive the wet sand and clay mixture from the first hydrocyclone; and
a second hydrocyclone configured to receive the wet sand and the clay mixture from the second compartment, and further separate the wet sand from the clay mixture to produce a clay product, wherein the third compartment is configured to receive the clay product from the second hydrocyclone.

2. The system of claim 1, wherein the process tank further comprises:
a first wall separating the first compartment from the second compartment, wherein the first wall extends partially towards a bottom of the process tank, defining a gap that provides the fluid communication between the first compartment and the second compartment; and
a second wall separating and providing isolation between the second compartment and the third compartment.

3. The system of claim 1, wherein the process tank further comprises:
a first mixer configured to mix the sand mixture within the first compartment;
a second mixer configured to mix the wet sand and the clay mixture in the second compartment; and
a third mixer configured to mix the clay product in the third compartment.

4. The system of claim 1, further comprising:
a first pump configured to pump the sand mixture from the first compartment to the first hydrocyclone; and
a second pump configured to pump the wet sand and the clay mixture from the second compartment to the second hydrocyclone.

5. The system of claim 4, further comprising a holding tank configured to receive the clay product from the third compartment.

6. The system of claim 5, further comprising a third pump configured to pump the clay product from the third compartment to the holding tank.

7. The system of claim 1, wherein the first hydrocyclone is larger than the second hydrocyclone.

8. The system of claim 1, further comprising a conveyor configured to transport the sand product from a hopper into the first compartment.

9. A method of processing a sand product, comprising:
adding water and the sand product to a first compartment of a process tank;
mixing the water and the sand product in the first compartment to create a sand mixture;
pumping the sand mixture from the first compartment to a first hydrocyclone;
separating, in the first hydrocyclone, the sand mixture into wet sand and a clay mixture;
receiving, from the first hydrocyclone, the wet sand and the clay mixture in a second compartment of the process tank;
pumping the wet sand and the clay mixture from the second compartment to a second hydrocyclone;
further separating, in the second hydrocyclone, the wet sand from the clay mixture to produce a clay product; and
receiving, from the second hydrocyclone, the clay product in a third compartment of the process tank that is isolated from the first compartment and the second compartment.

10. The method of claim 9, wherein the first compartment is in fluid communication with the second compartment.

11. The method of claim 9, wherein adding the water and the sand product to the first compartment includes continuously adding the water at a fixed water rate and the sand product at a fixed sand product rate such that a constant level is maintained in the first compartment while pumping the sand mixture from the first compartment to the first hydrocyclone.

12. The method of claim 9, further comprising:
pumping the clay product from the third compartment to a holding tank when a threshold level is reached within the third compartment.

13. A system for processing a sand product, comprising:
a process tank comprising:
a first compartment;
a second compartment in fluid communication with the first compartment; and
a third compartment that is isolated from the first compartment and the second compartment;
a first hydrocyclone;
a second hydrocyclone;
a first pump;
a second pump; and
a controller configured to:
operate the first pump to pump a sand mixture comprising the sand product and water from the first compartment to the first hydrocyclone such that a wet sand and a clay mixture flow from the first hydrocyclone into the second compartment; and
operate the second pump to pump the wet sand and the clay mixture from the second compartment to the second hydrocyclone such that a clay product flows from the second hydrocyclone to the third compartment.

14. The system of claim 13, further comprising a third pump and a holding tank, wherein the controller is further configured to receive a level of the clay product in the third compartment, and in response to the level reaching a threshold level, operating the third pump to pump the clay product to the holding tank.

15. The system of claim 13, wherein the process tank further comprises:
a first wall separating the first compartment from the second compartment, wherein the first wall extends partially towards a bottom of the process tank, defining a gap that provides the fluid communication between the first compartment and the second compartment; and
a second wall separating and providing isolation between the second compartment and the third compartment.

16. The system of claim 13, wherein the process tank further comprises:
a first mixer configured to mix the sand mixture within the first compartment;

a second mixer configured to mix the wet sand and the clay mixture in the second compartment; and a third mixer configured to mix the clay product in the third compartment.

17. The system of claim 13, wherein the first hydrocyclone is larger than the second hydrocyclone.

18. The system of claim 13, further comprising a conveyor configured to transport the sand product from a hopper into the first compartment.

19. The system of claim 18, wherein the controller is further configured to operate the conveyor to continuously add the sand product to the first compartment at a fixed sand product rate, and to continuously add water at a fixed water rate.

20. The system of claim 19, wherein the fixed sand product rate and the fixed water rate are selected such that a constant level is maintained in the first compartment while the controller operates the first pump to pump the sand mixture to the first hydrocyclone.

* * * * *